(12) United States Patent
Kaminsky et al.

(10) Patent No.: US 9,026,327 B2
(45) Date of Patent: May 5, 2015

(54) METHOD AND APPARATUS FOR EXECUTING A SHIFT PATH TO A TARGET POWERTRAIN STATE

(75) Inventors: Lawrence A. Kaminsky, White Lake, MI (US); Besim Demirovic, Troy, MI (US); Pinaki Gupta, Wixom, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 13/462,553

(22) Filed: May 2, 2012

(65) Prior Publication Data

US 2013/0296135 A1 Nov. 7, 2013

(51) Int. Cl.
| | | |
|---|---|---|
| *B60W 10/02* | (2006.01) | |
| *B60W 10/08* | (2006.01) | |
| *B60W 10/10* | (2012.01) | |
| *B60K 6/365* | (2007.10) | |
| *B60W 10/105* | (2012.01) | |
| *B60W 20/00* | (2006.01) | |
| *F16H 61/02* | (2006.01) | |
| *B60K 6/38* | (2007.10) | |

(52) U.S. Cl.
CPC ........... *B60K 6/365* (2013.01); *B60K 2006/381* (2013.01); *B60W 10/105* (2013.01); *B60W 20/20* (2013.01); *F16H 61/0213* (2013.01); *F16H 2302/02* (2013.01); *Y10T 477/688* (2015.01)

(58) Field of Classification Search
CPC ...... B60W 10/02; B60W 10/08; B60W 10/10
USPC ............................ 477/2, 34–181; 701/51–69
See application file for complete search history.

(56) References Cited

U.S. PATENT DOCUMENTS

| | | | | |
|---|---|---|---|---|
| 5,935,040 A | * | 8/1999 | Tabata et al. | 477/3 |
| 6,003,626 A | * | 12/1999 | Ibaraki et al. | 180/65.25 |
| 6,234,930 B1 | * | 5/2001 | Kaneko et al. | 475/5 |
| 6,953,409 B2 | * | 10/2005 | Schmidt et al. | 475/5 |
| 7,645,206 B2 | * | 1/2010 | Holmes et al. | 475/5 |
| 8,433,486 B2 | * | 4/2013 | Heap et al. | 701/54 |
| 8,469,860 B1 | * | 6/2013 | Kaminsky et al. | 477/79 |
| 2005/0209044 A1 | * | 9/2005 | Imazu et al. | 477/15 |
| 2006/0154780 A1 | * | 7/2006 | Ayabe et al. | 477/79 |
| 2007/0221421 A1 | * | 9/2007 | Tanishima | 180/65.2 |
| 2008/0032855 A1 | * | 2/2008 | Sah et al. | 477/3 |

(Continued)

FOREIGN PATENT DOCUMENTS

| | | |
|---|---|---|
| DE | 4422554 C1 | 10/1995 |
| DE | 19637210 B4 | 3/1998 |

(Continued)

OTHER PUBLICATIONS

U.S. Appl. No. 13/461,110, Kaminsky, et al.

(Continued)

*Primary Examiner* — Calvin Cheung
*Assistant Examiner* — Courtney Heinle

(57) ABSTRACT

A method for controlling a transmission of a powertrain system includes executing a single source shortest path search to identify a preferred shift path originating with an initial powertrain state and terminating at a target powertrain state, wherein the single source shortest path search employs transition-specific costs and situational costs to identify the preferred shift path. The preferred shift path is executed to achieve the target powertrain state.

19 Claims, 2 Drawing Sheets

(56) References Cited

U.S. PATENT DOCUMENTS

| | | | |
|---|---|---|---|
| 2008/0120000 A1* | 5/2008 | Heap et al. | 701/54 |
| 2009/0112416 A1* | 4/2009 | Heap et al. | 701/54 |
| 2009/0112418 A1* | 4/2009 | Buur et al. | 701/55 |
| 2009/0118084 A1* | 5/2009 | Heap et al. | 477/5 |
| 2009/0118926 A1* | 5/2009 | Heap et al. | 701/54 |
| 2009/0118930 A1* | 5/2009 | Heap et al. | 701/54 |
| 2009/0118931 A1* | 5/2009 | Kaminsky et al. | 701/54 |
| 2009/0118937 A1* | 5/2009 | Heap et al. | 701/54 |
| 2009/0118946 A1* | 5/2009 | Heap et al. | 701/55 |
| 2009/0118949 A1* | 5/2009 | Heap et al. | 701/55 |
| 2013/0217536 A1* | 8/2013 | Demirovic et al. | 477/4 |
| 2013/0225361 A1* | 8/2013 | Gupta et al. | 477/3 |
| 2013/0332037 A1* | 12/2013 | Xia et al. | 701/58 |
| 2014/0046522 A1* | 2/2014 | Heap et al. | 701/22 |

FOREIGN PATENT DOCUMENTS

| | | |
|---|---|---|
| DE | 10206561 A1 | 10/2002 |
| WO | 0026552 A2 | 5/2000 |

OTHER PUBLICATIONS

Chimani, Marcus, Shortest Path, VO Algorithmische Graphentheorie, SoSe 2010.

Taubig, Hanjo, Grundlagen: Algorithmen und Datenstrukturen, Sommersemester 2010, Munchen.

Taubig, Hanjo, Fortgeschrittene Netzwerk- und Graph-Algorithmen, Wintersemester 2010/11, Munchen.

Mutzel, Petra, Ankundigung fur SS09, WS 08/09, Technische Universitat Dortmund.

* cited by examiner

METHOD AND APPARATUS FOR EXECUTING A SHIFT PATH TO A TARGET POWERTRAIN STATE

TECHNICAL FIELD

This disclosure is related to dynamic system controls for powertrain systems employing torque transmission devices.

BACKGROUND

The statements in this section merely provide background information related to the present disclosure. Accordingly, such statements are not intended to constitute an admission of prior art.

Known powertrain systems are configured to transfer torque from a torque-generative device through a transmission device to an output member coupled to a driveline. Some powertrain systems may be configured to transfer torque originating from multiple torque-generative devices through a multi-mode transmission device to an output member coupled to a driveline. Such powertrain systems include hybrid powertrain systems and extended-range electric vehicle systems. Control systems for operating such powertrain systems control the torque-generative devices and apply selected torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that operate as motors or generators to generate torque input to the transmission independently of torque input from the internal combustion engine. The torque machines may react torque, i.e., transform vehicle kinetic energy transferred through the vehicle driveline to electrical energy that is storable in an electrical energy storage device in what is referred to as a regenerative operation. A control system monitors inputs from the vehicle and the operator and provides operational control of the powertrain, including controlling an engine on/off state, controlling a transmission operating state, controlling the torque-generative devices, and regulating the electrical power interchange among the electrical energy storage device and the electric machines to manage outputs of the transmission, including torque and rotational speed. Known multi-mode transmission devices employ torque-transfer clutch devices to transfer torque between the engine, the torque machines and the driveline. Operating a multi-mode transmission device includes operating in one of a plurality of transmission states including fixed gear, variable, and neutral states. Operating an engine can include operating in engine-on and engine-off states.

Control of a powertrain system includes control of the transmission to activate and deactivate the clutches to effect operation in a selected operating state and to shift between the operating states. Control of a powertrain system includes control of engine operation to effect operation in an engine-on state and an engine-off state and to shift between the states. A shift path between powertrain states may include a plurality of sequentially executed transitions between powertrain states that includes transmission shifts and engine on/off shifts. There may be multiple shift paths between an initial operating state and a target operating state in a multi-mode transmission.

SUMMARY

A method for controlling a transmission of a powertrain system includes executing a single source shortest path search to identify a preferred shift path originating with an initial powertrain state and terminating at a target powertrain state, wherein the single source shortest path search employs transition-specific costs and situational costs to identify the preferred shift path. The preferred shift path is executed to achieve the target powertrain state.

BRIEF DESCRIPTION OF THE DRAWINGS

One or more embodiments will now be described, by way of example, with reference to the accompanying drawings, in which.

DETAILED DESCRIPTION

Figure 1:
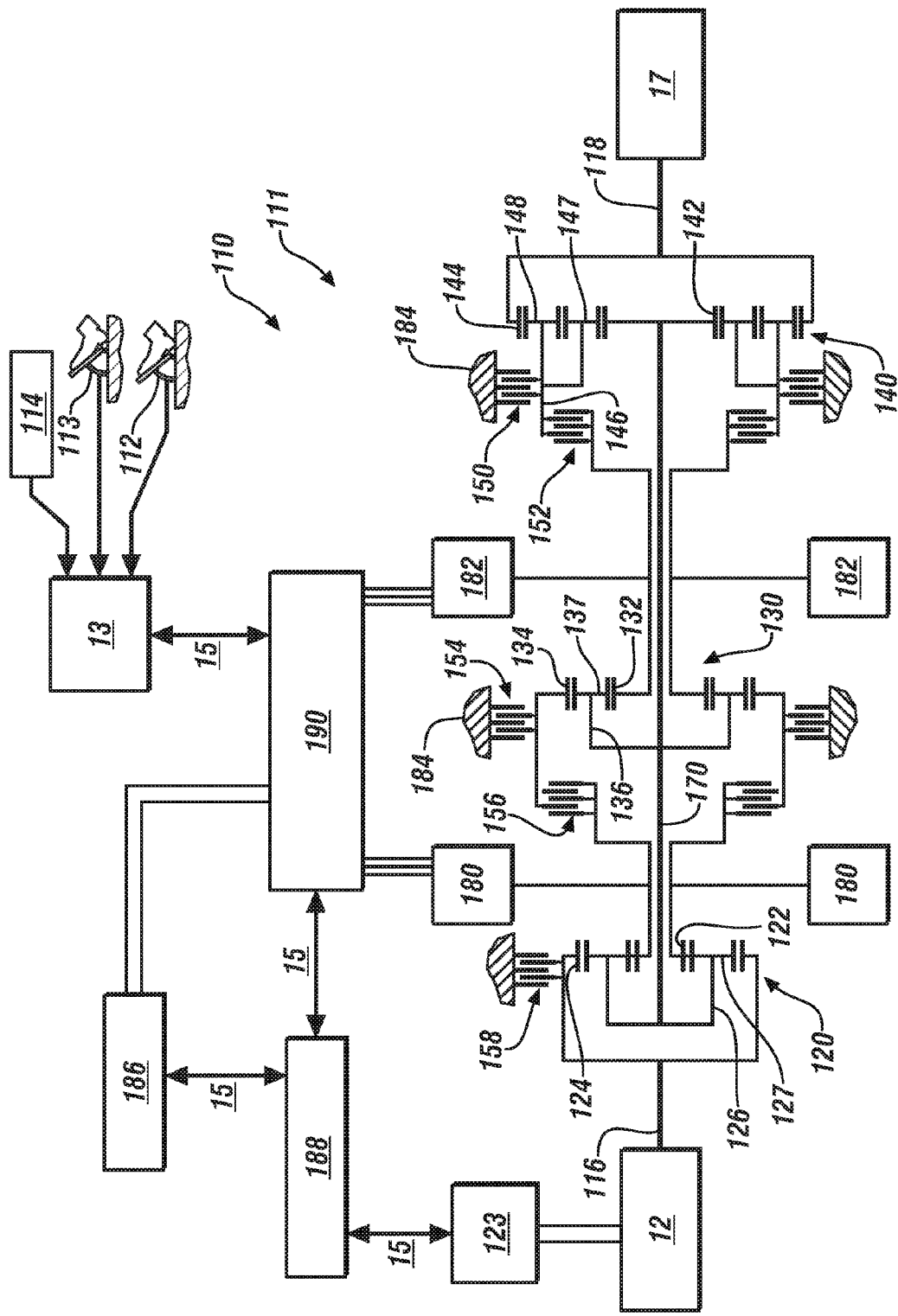
FIG. 1 illustrates a powertrain system including an internal combustion engine, an electro-mechanical transmission, a driveline, and a controller in accordance with the disclosure.

Referring now to the drawings, wherein the showings are for the purpose of illustrating certain exemplary embodiments only and not for the purpose of limiting the same, FIG. 1 shows an embodiment of a powertrain 110 including an internal combustion engine 12 and a transmission 111 that are coupled to a final drive mechanism 17. The engine 12 couples to the transmission 111 via an input member 116. The illustrated transmission 111 is a multi-mode transmission that includes an output member 118 rotatably coupled to the final drive mechanism 17. Alternatively, the transmission may include any transmission that shifts between a first transmission state and a second transmission state.

The transmission 111 in one embodiment includes three planetary gear sets 120, 130, and 140 and is configured to receive at least a portion of its driving power from the engine 12 in some of its operating modes. The transmission 111 couples to first and second torque machines 180 and 182, respectively. The transmission 111 is configured to transfer torque between the engine 12, the torque machines 180, 182, and the output member 118 in response to an output torque request. The engine 12 is configured to execute autostop and autostart operations during ongoing powertrain operation in response to operating conditions. The first and second torque machines 180, 182 in one embodiment are motor/generators that employ electric energy to generate and react torque. Alternatively the torque machines may employ hydraulic energy, pneumatic energy, or another suitable energy source to generate and react torque. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 118 to enable one of a forward and a reverse direction. The user interface 13 may include a single device, as shown, or alternatively may include a plurality of user interface devices directly connected to individual control modules.

The planetary gear set 120 includes a sun gear member 122, a ring gear member 124, and a carrier member 126. The carrier member 126 rotatably supports a plurality of pinion gears 127 that are disposed in meshing relationship with both the sun gear member 122 and the ring gear member 124. The planetary gear set 130 includes a sun gear member 132, a ring gear member 134, and a carrier member 136 that rotatably supports a plurality of pinion gears 137 that are disposed in meshing relationship with both the sun gear member 132 and the ring gear member 134. The planetary gear set 140 includes a sun gear member 142, a ring gear member 144, and a carrier member 146. The carrier member 146 rotatably supports a first set of pinion gears 147 as well as a second set of pinion gears 148. The first set of pinion gears 147 is disposed in meshing relationship with both the sun gear member 142 and the second set of pinion gears 148. The second set of pinion gears 148 is disposed in meshing relationship with the first set of pinion gears 147 and with the ring gear member 144. Thus, the planetary gear set 140 is a compound, sun gear member-pinion gear-pinion gear-ring gear member gear set, referred to herein as a S-P-P-R gear set. An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The first torque machine 180 is continuously connected with the sun gear member 122. The input member 116 is connected for common rotation with the ring gear member 124. The second torque machine 182 is connected for common rotation with the sun gear member 132. Ring gear member 144 is connected for common rotation with the output member 118. The first and second torque machines 180, 182 each have a rotor and a stator that is grounded to a stationary member, such as a transmission case. The first and second torque machines 180, 182 electrically connect to an energy storage device 186 such as a high-voltage battery to transfer electric power therebetween. A hybrid control module (HCP) 188 is in signal communication via communications link 15 with the high-voltage battery 186 and with a power inverter 190 that is also in electrical communication with the stator portions of the first and second torque machines 180, 182. The communications link 15 provides structured communications between the HCP 188, the ECM 123, and the user interface 13. The HCP 188 responds to a variety of input signals including vehicle speed, an output torque request, charge state of the high-voltage battery 186, and engine power to regulate the flow of electric power between the first and second torque machines 180, 182 and the high-voltage battery 186 via the inverter 190. The first and second torque machines 180, 182 can be deactivated so no torque is transferred between the engine and the first and second torque machines 180, 182 to avoid charging spikes to the high-voltage battery 186 due to increases in engine speed and torque during engine cold starts. The HCP 188 has supervisory control over an engine control module (ECM) 123 configured to monitor inputs from sensors to determine states of engine parameters. The ECM 123 can be configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 111 includes a plurality of clutches C1 150, C2 152, C3 154, C4 156, and C5 158. Clutch C1 150 is a stationary clutch, also referred to as a brake that is selectively engageable to ground the carrier member 146 to a stationary member 184. Clutch C2 152 is a rotating clutch that is selectively engageable to connect sun gear member 132 and motor/generator 182 for common rotation with carrier member 146. Clutch C3 154 is a stationary clutch that is selectively engageable to ground the ring gear member 134 to the stationary member 184. Clutch C4 156 is a rotating clutch that is selectively engageable to connect the motor/generator 180 and the ring gear member 134 for common rotation. Clutch C5 158 is a stationary clutch that is selectively engageable to connect and ground the ring gear member 124 to the stationary member 184.

When the clutch C1 150 is engaged, carrier member 146 is a reaction member within the planetary gear set 140, and power transferred via the interconnecting member 170 will be transferred through the sun gear member 142 to the ring gear member 144 and therefore to the output member 118. When the clutch C2 152 is engaged, the motor/generator 182 receives power from or delivers power to carrier member 146 as well as the sun gear member 132. When the clutch C3 154 is engaged, ring gear member 134 is held stationary and becomes a reaction member within the planetary gear set 130. When the clutch C4 156 is engaged, the motor/generator 180 is connected for rotation with the ring gear member 134, and either receives or accepts power through the ring gear member 134 as well as the sun gear member 122. When clutch C5 158 is engaged, ring gear member 124 is held stationary and becomes a reaction member within the planetary gear set 120, such that the speed of the input member 116 is locked-up.

The powertrain 110 is configured to operate in one of a plurality of powertrain states, including a plurality of ranges of the transmission 111 and engine states of on and off When the engine is in the off state, it is unfueled, not firing, and is not spinning. When the engine is in the on state it is fueled, firing, and spinning. The transmission 111 is configured to operate in one of a plurality of neutral (neutral), fixed gear (Gear #), variable mode (EVT Mode #), electric vehicle (EV#) and transitional (EV Transitional State #), (pseudoGear #) states through selective activation of the clutches C1 150, C2 152, C3 154, C4 156, and C5 158. Table 1 depicts a plurality of powertrain states including transmission states and engine states for the powertrain 110 with clutch application designated x.

TABLE 1

| Steady State Range | Engine State | C1 | C2 | C3 | C4 | C5 |
|---|---|---|---|---|---|---|
| Neutral | on/off | | | | | |
| Neutral | on/off | | x | | | |
| Neutral | on/off | | | x | | |
| pseudoGear 1 | on/off | x | | | | |
| pseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | x | x | | |
| EVT Transitional State 1 | off | x | | | | x |
| EVT Transitional State 2 | off | | x | | | x |
| Gear 1 | on | x | | x | x | |
| Gear 2 | on | x | x | | x | |
| Gear 3 | on | | x | x | x | |
| EV1 (Electric Vehicle 1) | off | x | | x | | x |
| EV2 (Electric Vehicle 2) | off | x | | | x | x |
| EV3 (Electric Vehicle 3) | off | | x | | x | x |
| EV4 (Electric Vehicle 4) | off | | x | x | | x |
| EV Transitional State 3 | off | x | x | | | x |
| Neutral | on/off | | | x | x | |
| pseudoGear 3 | on/off | x | x | | | |
| Neutral | off | | | x | | x |
| Neutral | off | | | | x | x |

Figure 2:
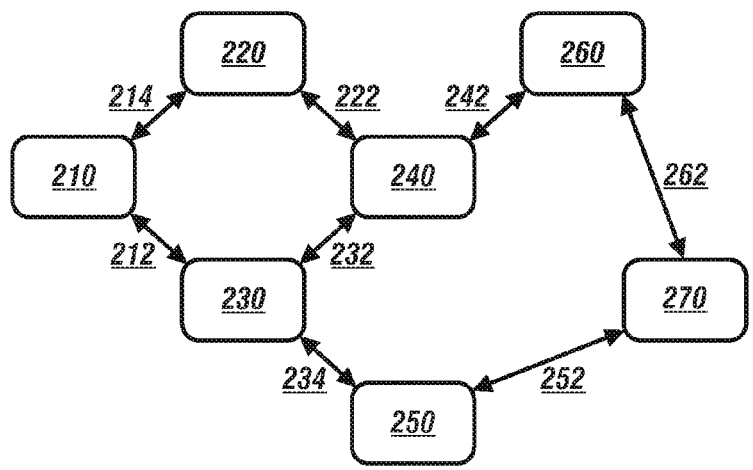
FIG. 2 illustrates alternate shift paths between an initial powertrain state and a target powertrain state, including a plurality of intermediate powertrain states in accordance with the disclosure.

FIG. 2 schematically shows alternate shift paths between an initial powertrain state 210 and a target powertrain state 270, including a plurality of intermediate powertrain states 220, 230, 240, 250, and 260. A shift path is a sequence of discrete steps or transitions between an initial powertrain state and a target powertrain state that may include one or more intermediate powertrain states and preferably includes at least one transition between two transmission states. A transition is a single direct change from a first powertrain state to a second powertrain state, and may including activating a single one of the clutches, deactivating a single one of the clutches, autostarting the engine, and autostopping the engine.

The plurality of intermediate powertrain states indicates that there can be multiple potential shift paths between two powertrain states, including changes in the engine state as part of the powertrain state. For example, a shift from transmission state A with the engine off to transmission state B with the engine off may be performed through a shift path which involves intermediate transitions of autostarting the engine and subsequently autostopping the engine. An ideal shift path is a shift path that has a minimum cost, with the cost dependent on current operating conditions. However, in the presence of a fault, the ideal shift path may be unachievable, and an alternative shift path may be needed to execute a shift from the initial powertrain state 210 to the target powertrain state 270.

A plurality of transitions is shown between the adjacent powertrain states, including transitions 212, 214, 222, 232, 234, 242, 252, and 262. Each of the aforementioned transitions is a single direct change between the aforementioned powertrain states 210, 220, 230, 240, 250, 260, and 270. The aforementioned transitions are shown as being bi-directional. Alternatively, one or more of the transitions may be uni-directional. Each of the transitions has a cost associated therewith, with the cost including a transition-specific cost and a situational cost. As is appreciated, there is no direct or obvious path between the initial powertrain state 210 and the target powertrain state 270.

Figure 3:
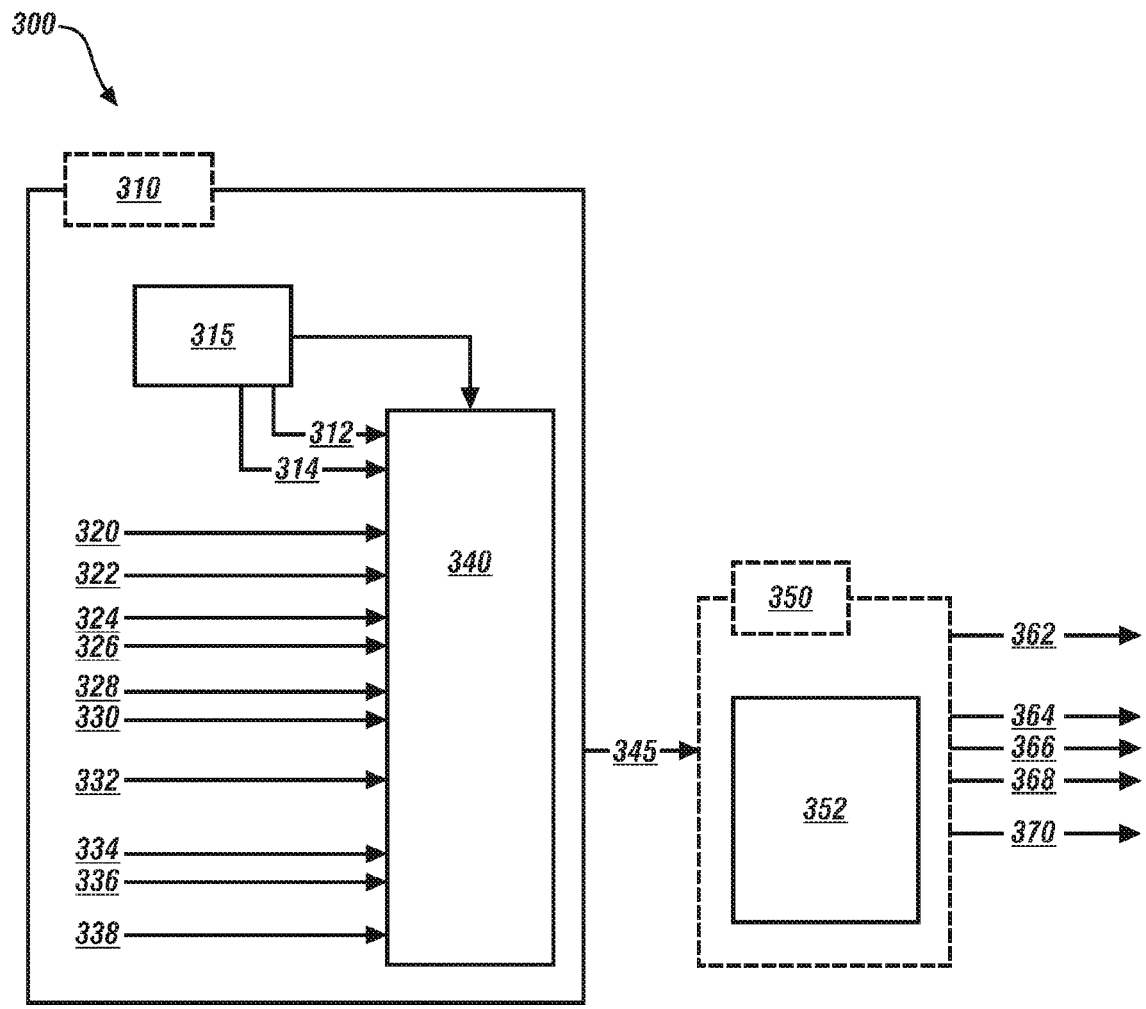
FIG. 3 illustrates a control scheme that includes identifying and executing a preferred shift path between an initial powertrain state and a target powertrain state in accordance with the disclosure.

FIG. 3 schematically shows a control scheme 300 that includes identifying a preferred shift path between an initial powertrain state and a target powertrain state (310), and then executing the preferred shift path to achieve the target powertrain state (350). The control scheme 300 is described with reference to the illustrated powertrain 110 of FIG. 1. It is appreciated that the control scheme 300 may instead be applied to other suitable powertrain systems with similar effect. Exemplary powertrain states include those transmission states and engine states described with reference to FIG. 1 for an embodiment of the powertrain 110.

The preferred shift path is a path from the initial powertrain state to the target powertrain state that minimizes total shift costs including the transition-specific costs and the situational costs, including accounting for and accommodating system and component faults. The preferred shift path may include either a single transition or a plurality of sequentially executed transitions between the initial powertrain state and the target powertrain state. The preferred shift path may include no intermediate powertrain states, or may include one or more intermediate powertrain states.

Identifying the preferred shift path between the initial powertrain state and the target powertrain state (310) is an iterative process that includes executing a single source shortest path search algorithm 315 and an associated cost function 340 that takes into account a plurality of factors to determine the transition-specific cost and the situational cost for each of a plurality of candidate transitions between source states 312 and destination states 314. The source states 312 and the destination states 314 include all allowable states including the initial powertrain state, allowable intermediate powertrain states (if any) and the target powertrain state. Candidate transitions include any possible transitions between the allowable states, thus excluding transitions to states where faults are present.

The single source shortest path search algorithm 315 is executed to identify a least-cost shift path 345 between the initial powertrain state and the target powertrain state employing the cost function 340. One known process for executing a single source shortest path search is Dijkstra's algorithm, which may be employed to determine a shortest path by iteratively evaluating costs associated with the candidate transitions between the source powertrain states 312 and destination powertrain states 314. The single source shortest path search algorithm 315 identifies the least-cost shift path 345, which includes preferred transition(s) between sequential source powertrain states 312 and destination powertrain states 314 based upon outputs of the cost function 340 for a plurality of candidate transitions. The cost function 340 accounts for the transition-specific costs and the situational costs. The single source shortest path search algorithm 315 ignores all transitions to states that are not presently permitted. In the example described herein with reference to FIG. 2, operation in powertrain state 260 may be prohibited, and thus transitions 242 and 262 to powertrain state 260 may not be included as allowable candidate transitions.

Transition-specific costs include those costs associated with executing a candidate transition between the source powertrain states 312 and destination powertrain states 314. Each of the aforementioned candidate transitions has a precalibrated, dedicated transition-specific cost associated therewith, and may include costs associated with elapsed time and power loss to execute the candidate transition.

Situational costs include those costs associated with transitions to intermediate states that the system may want to encourage or discourage. Exemplary powertrain inputs that are employed to determine the situational costs for the powertrain 110 described with reference to FIG. 1 include the following:

- output torque request 320, determined based upon operator input(s) to the accelerator pedal 113 and the operator brake pedal 112;
- PRNDL position 322, determined based upon operator input to the transmission range selector 114;
- initial engine state 324, i.e., the engine 12 in the on state or the off state;
- initial engine speed 326;
- target engine state 328, i.e., the engine 12 in the on state or the off state;
- target engine speed 330;
- architecture-specific maneuver indications 332;
- fault-based state availability 334;
- component speed-based state availability 336, i.e., limits on speeds of various components of the powertrain 110 including the planetary gears 120, 130, and 140 and the torque machines 180 and 182; and
- other costs that affect shift path selection such the output speed and battery charge/discharge limits 338.

The situational costs include a shift-through-neutral penalty, an engine start/stop penalty, a shift-to-fixed-gear penalty, a shift-to-pseudo-gear penalty, and a shutdown penalty.

The architecture-specific maneuver indications 332, include, e.g., a low power key-crank request and a powertrain shutdown request. Such architecture-specific maneuver indications permit evaluation of alternative transition paths based on specific criteria responsive to the requirements of the powertrain system. By way of example, alternative key crank sequences may be evaluated based on battery power limitations.

Any state that is considered unachievable (either due to a clutch related failure or speed constraints) is identified, and all transitions to that state will be effectively removed from the set of considered transitions. Furthermore, if the currently achieved state becomes invalid or unachievable due to speed constraints (e.g., operating in one of the fixed gear transmission states when a component is at risk of over/under-speeding), only the set of transitions that lead to operating states having multi-speed degrees of freedom states will be considered, including, e.g., variable mode states, transitional states, and electric vehicle states described with reference to Table 1 for the illustrated powertrain system 110. This is done to help ensure that a single point fault (e.g., a stuck or slow-to-release clutch) will not by itself lead to a speed ratio violation.

The shift-through-neutral penalty provides a cost penalty to discourage an operation that includes a shift-through-neutral operation when the vehicle operator expects uninterrupted propulsion. A penalty cost associated with all transitions that effect a shift to neutral is included in the situational costs in such an event. Some powertrain architectures support multiple neutral transmission states, and include the engine in either the on state or the off state. The illustrated powertrain 110 described with reference to FIG. 1 includes seven different clutch combinations that are all considered neutral, as shown with reference to Table 1. When the engine state is added onto these clutch combinations, there are eleven neutral states. As such, many candidate shift paths may include a neutral state. The neutral penalty may include a calibratable penalty for shifting between two fixed gear or variable mode states when the target state is a neutral state, a calibratable penalty for shifting from a neutral state to a fixed gear or variable mode state when the target state is a neutral state, a calibratable penalty for shifting between two neutral states when the target state is a fixed gear or variable mode state, and a calibratable penalty for shifting from a fixed gear or variable mode state to a neutral state when the target state is a fixed gear or variable mode state.

The engine start/stop penalty provides a cost penalty to discourage an operation that includes either or both engine autostart and autostop operations. The powertrain architecture described with reference to FIG. 1 includes engine autostart and autostop operations in multiple states. Thus, a shift path may include sequencing the shifts and the start/stop operations. The engine start/stop penalty may include a calibratable penalty associated with transitioning between two engine-on states when the target state is engine-off, and a calibratable penalty associated with transitions that involve performing an autostart when a target powertrain state includes the engine in the off state. The engine start/stop penalty may include a calibratable penalty associated with transitioning between two engine-off states when the target engine state is engine-on. This may include two separate penalties, i.e., separate penalties associated with an operator request for power on and an operator request for power off. The rationale for this is that under power-off conditions, elongating engine-off operation prior to executing an engine autostart operation to achieve an engine-on state is less noticeable and thus less objectionable than elongating engine-off operation prior to executing an engine autostart operation under power-on conditions. The engine start/stop penalty may include a calibratable penalty associated with transitions that involve executing an autostop operation when the target powertrain state includes the engine in the engine-on state.

Furthermore, it may be desirable to perform a low-power key crank in an alternative transmission state. In the embodiment described with reference to FIG. 1, key-cranks are preferably performed in a specific transmission state, e.g., a C3—neutral transmission state. However, for a low power key-crank, the preferred transmission state for executing a key-crank may be in a C3-C4—neutral powertrain state. Thus, there may be a penalty added to any engine-on transition that is executed in a transmission state other than the preferred transmission state identified for the key-crank types.

The shift-to-fixed gear penalty provides a cost penalty to discourage an operation that includes transitioning to a fixed gear state under specific circumstances. The shift-to-fixed gear penalty is determined by comparing the current engine speed and target engine speed to the engine speed dictated by operating the transmission in the fixed gear ratio. In cases where the engine speed must pass through the fixed gear ratio, a low (or no) penalty cost may be applied. Conversely, in cases where the engine speed must be noticeably increased or decreased in order to effect the shift through fixed-gear, a larger penalty based on the magnitude of engine increase/decrease may be applied.

The shift-to-pseudo-gear penalty provides a cost penalty to discourage an operation that includes transitioning to a pseudo-gear state under specific circumstances. The penalty cost associated with a shift to pseudo-gear is determined based on the ability of the powertrain to produce the request output torque. Additionally, the penalty cost includes consideration for any effect a change in engine speed has on battery power in relation to present battery power limits.

Executing the preferred shift path, i.e., the least-cost shift path 345 to achieve the target powertrain state (350) is an iterative process of sequentially executing transitions from the initial powertrain state to the intermediate powertrain states, if any, to the target powertrain state. Executing the preferred shift path includes identifying the next state in the shift path (362), i.e., one of the intermediate states or the target state, monitoring transmission speeds (364), determining information related to a pending autostop or autostart operation (366, 368), and determining other relevant information affecting execution of the pending transition (370). Control operations are executed to effect each of the transitions, including synchronizing and activating oncoming clutch(es), deactivating off-going clutch(es), commanding changes in motor torques and engine torque, executing engine autostart or autostop commands, and others. Execution of the preferred shift path ends upon achieving the target powertrain state. The iterative process includes executing a reverse path traversal (352). The least-cost shift path 345 is preferably expressed as a sequence of linked transmission and engine states. Executing the reverse path traversal 352 includes executing a second iterative loop through the transitions of the least-cost shift path 345 and acquiring updated relevant speed and torque information to execute of the individual transitions of the shift path.

Executing the reverse path traversal 352 preferably occurs coincident with executing the least-cost shift path 345.

The control scheme 300 identifies a preferred shift path which is the least-cost shift path 345 between the initial powertrain state and the target powertrain state and executes the preferred shift path to achieve the target powertrain state in a powertrain system architecture that affords a plurality of shift path options. The preferred shift path includes a plurality of sequentially executed transitions between adjacent powertrain states that minimizes total costs including transition-specific costs and situational costs, and accounts for and accommodates system and component faults. Thus, a powertrain shift architecture is created in which the selected shift path between transmission states is accomplished based upon the output torque request and the current operating conditions to improve overall drive quality. Furthermore overall system availability can be extended in the presence of a fault that makes specific transmission states or engine states unavailable, with alternative transitions based on specific criteria more easily realized for a given architecture's unique requirements. Thus, alternative shift paths can be identified that are achievable under both normal operation and in response to a fault.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a transmission of a powertrain system, the method comprising:
    executing a single source shortest path search to identify a preferred shift path originating with an initial powertrain state and terminating at a target powertrain state, said single source shortest path search employing transition-specific costs and situational costs to identify the preferred shift path, wherein the preferred shift path comprises a path from the initial powertrain state to the target powertrain state that minimizes total shift costs, said total shift costs comprising the transition-specific costs and the situational costs, wherein each transition-specific cost comprises a cost associated with elapsed time and power loss associated with executing a candidate transition to a powertrain state and wherein each situational cost comprises a penalty cost associated with discouraging executing selected ones of the candidate transitions, each candidate transition including a pre-calibrated, dedicated one of the transition-specific costs associated therewith that is independent of instantaneous operational parameters of the powertrain system; and
    executing, by a controller, the preferred shift path to achieve the target powertrain state.

2. The method of claim 1, wherein employing situational costs to identify the preferred shift path includes employing a situational cost comprising a shift to neutral penalty discouraging executing a candidate transition comprising a shift to a neutral state.

3. The method of claim 1, wherein employing situational costs to identify the preferred shift path includes employing an engine start/stop penalty discouraging executing a candidate transition comprising one of an engine autostart operation and an engine autostop operation.

4. The method of claim 1, wherein employing situational costs to identify the preferred shift path includes employing a shift-to-fixed-gear penalty discouraging executing a candidate transition comprising a shift to a fixed-gear state.

5. The method of claim 1, wherein employing situational costs to identify the preferred shift path includes employing a shift-to-pseudo-gear penalty discouraging executing a candidate transition comprising a shift to a pseudo-gear state.

6. The method of claim 1, wherein employing situational costs to identify the preferred shift path includes employing a shutdown penalty discouraging executing a candidate transition comprising a shutdown.

7. The method of claim 1, wherein employing situational costs to identify the preferred shift path includes employing a low-power key crank cost discouraging executing a candidate transition comprising a low-power key crank.

8. The method of claim 1, further comprising executing a reverse path traversal coincident with executing the preferred shift path between the initial powertrain state and the target powertrain state.

9. The method of claim 8, wherein executing the reverse path traversal comprises executing a second iterative loop through the preferred shift path to acquire updated relevant speed and torque information to execute transitions of the preferred shift path.

10. The method of claim 1, wherein the preferred shift path originating with the initial powertrain state and terminating at the target powertrain state comprises a single transition between the initial powertrain state and the target powertrain state.

11. The method of claim 1, wherein the preferred shift path originating with the initial powertrain state and terminating at the target powertrain state comprises a plurality of sequentially executed transitions to intermediate powertrain states between the initial powertrain state and the target powertrain state.

12. A method for controlling a multi-mode transmission of a powertrain system, the method comprising:
    determining a transition-specific cost for each of a plurality of candidate transitions from an initial powertrain state to a target powertrain state;
    identifying a preferred shift path between the initial powertrain state and the target powertrain state including a plurality of sequentially executed transitions originating with the initial powertrain state and terminating at the target powertrain state by executing a single source shortest path search that employs the respective transition-specific costs and situational costs, wherein the preferred shift path comprises a path from the initial powertrain state to the target powertrain state that minimizes total shift costs, said total shift costs comprising the transition-specific costs and the situational costs, wherein each transition-specific cost comprises a cost associated with elapsed time and power loss associated with executing a candidate transition to a powertrain state and wherein each situational cost comprises a penalty cost associated with discouraging executing selected ones of the candidate transitions, each candidate transition including a pre-calibrated, dedicated one of the transition-specific costs associated therewith that is independent of instantaneous operational parameters of the powertrain system; and executing, by a controller, the preferred shift path between the initial powertrain state and the target powertrain state.

13. The method of claim 12, further comprising executing a reverse path traversal coincident with executing the preferred shift path between the initial powertrain state and the target powertrain state.

14. The method of claim 13, wherein executing the reverse path traversal comprises executing a second iterative loop through the preferred shift path to acquire updated relevant speed and torque information to execute the sequentially executed transitions of the preferred shift path.

15. The method of claim 12, wherein employing situational costs to identify the preferred shift path includes employing a shift to neutral penalty discouraging executing a candidate transition comprising a shift to a neutral state.

16. The method of claim 12, wherein employing situational costs to identify the preferred shift path includes employing an engine start/stop penalty discouraging executing a candidate transition comprising one of an engine autostart operation and an engine autostop operation.

17. The method of claim 12, wherein employing situational costs to identify the preferred shift path includes employing a shift-to-fixed-gear penalty discouraging executing a candidate transition comprising a shift to a fixed gear state.

18. A method for controlling a multi-mode transmission of a powertrain system, the method comprising:

executing a single source shortest path search to identify a preferred shift path including a plurality of sequentially executed transitions originating with an initial powertrain state and terminating at a target powertrain state employing transition-specific costs and situational costs, wherein the preferred shift path comprises a path from the initial powertrain state to the target powertrain state that minimizes total shift costs, said total shift costs comprising the transition-specific costs and the situational costs, wherein each transition-specific cost comprises a cost associated with elapsed time and power loss associated with executing a candidate transition to a powertrain state and wherein each situational cost comprises a penalty cost associated with discouraging executing selected ones of the candidate transitions, each candidate transition including a pre-calibrated, dedicated one of the transition-specific costs associated therewith that is independent of instantaneous operational parameters of the powertrain system; and executing, by a controller, the preferred shift path between the initial powertrain state to the target powertrain state.

19. The method of claim 18, further comprising executing a reverse path traversal coincident with executing the preferred shift path between the initial powertrain state and the target powertrain state, said reverse path traversal comprising a second iterative loop through the preferred shift path to acquire updated relevant speed and torque information to execute the preferred shift path.

* * * * *